DETACHABLE SPINDLE FOR AUTOMATIC RECORD PLAYERS

Filed Dec. 29, 1964 2 Sheets-Sheet 1

INVENTOR.
NORMAN LANE
BY
Kurt Kelman
Agent

DETACHABLE SPINDLE FOR AUTOMATIC RECORD PLAYERS

INVENTOR
NORMAN LANE
BY
Kurt Kelman
Agent 3,322,428

DETACHABLE SPINDLE FOR AUTOMATIC RECORD PLAYERS

Norman Lane, Halesowen, England, assignor to BSR Limited, Old Hill, England, a British company Filed Dec. 29, 1964, Ser. No. 421,782
2 Claims. (Cl. 274—10)

This invention relates to automatic record players of the type in which a stack of records is supported above the turntable of the apparatus upon a centre spindle which projects upwardly, from the base plate of the record player, through the turntable, and which contains a pivoted lever adapted, when the lower end thereof is operated on by a reciprocable member of the automatic record player mechanism during a cycle of operations, to release the lowermost record of the stack and allow it to drop on to the turntable whilst holding the next record above in position at the top of the spindle ready for its release when the next cycle of operations commences.

This type of automatic record player is generally well-known today and its centre spindle is a relatively long spindle as it has to support the stack of records above the turntable whilst allowing sufficient clearance below the stack for the passage of the pick-up arm when playing a record which is on the turntable. Hereinafter and in the appendant claims this form of spindle is referred to as the "long" spindle.

It is sometimes desired to operate such a record player manually, instead of having the automatic cycle of operations, for the playing of single records and in such a case it is desirable to be able to use a shorter centre spindle and, therefore, necessary to be able to remove the long centre spindle and substitute a short centre spindle in its place.

There have previously been certain proposals for a detachable form of long centre spindle to enable same to be replaced by a short centre spindle, but generally these have involved a somewhat complicated mechanism for locking the spindle in position and means for unlocking when it is desired to remove the spindle.

Further, it is important, when replacing the centre spindle, to make sure that it is inserted into the base plate of the record player in correct orientation so that the lower end of the rocking level may be acted on by the reciprocating member of the automatic record player mechanism, otherwise damage may result to the spindle as is mentioned more specifically hereinafter.

The object of the present invention is to provide a new or improved arrangement for a detachable centre spindle in an automatic record player of the type above specified, which will not involve any complicated mechanism below the base plate of the record player and which will ensure correct orientation of the long centre spindle when this is replaced.

The invention is illustrated in the accompanying drawings wherein.

Figure 1:
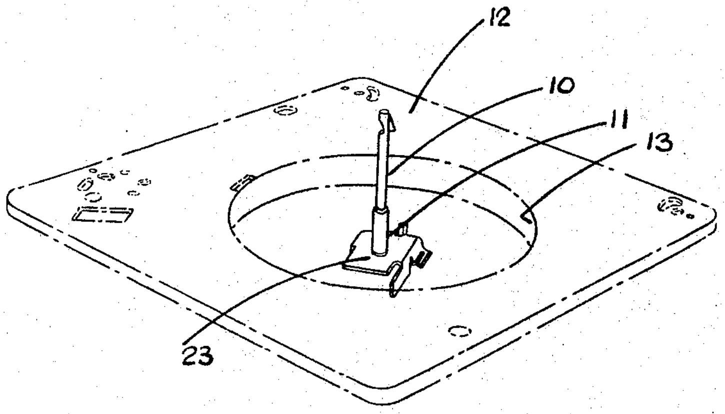
FIGURE 1 is a perspective view from above illustrating the position of the centre spindle on the base plate of a record player.

As shown in FIGURE 1, the centre spindle 10 is detachably mounted in a central sleeve 11 fixed to the base plate 12 of the apparatus and projecting upwardly therefrom, so that the centre spindle, when in position, projects upwardly through the centre of the turntable which rotates in the circular recess 13 in the base plate.

Referring now to FIGURES 2–5, the centre spindle 10 is of generally known construction having at its upper end a sliding keeper 14 and a shoulder 15 for supporting a stack of records and having mounted, in a slot 16 extending downwardly from below the shoulder 15, a rocking level 17 which at its lower end 18 projects a short distance from the bottom of the spindle and is adapted to be operated in known manner by a reciprocating member (not shown) below the base plate 12 during a cycle of operations to move the upper end of the rocking member 14 transversely and displace the lowermost record of the stack so that it slides down the centre spindle on to the turntable.

Figure 5:
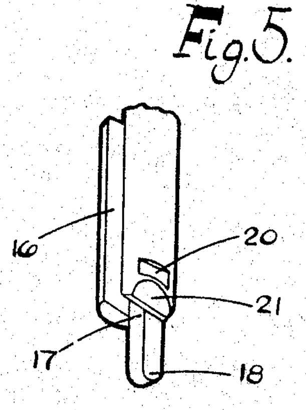
FIGURE 5 is a detail view of the lower end of the spindle.

The centre spindle is generally circular in cross-section over the major portion of its length from the shoulder 15 downward but at its bottom end, in accordance with the invention, it has part of its wall cut away to provide a flat section 19 making this end of non-circular cross-section, and as the spindle has the slot 16 extending over the major portion of its length there is, in effect, created a bifurcated form of the lower end of the spindle with two legs extending downwardly (see FIG. 5).

On one of these legs (see FIG. 5) near to the bottom there is provided a chordal groove 20 which extends in a direction at right angles to the axis of the spindle and the lower edge of the leg immediately below the groove is chamfered at 21 so as to enable easy engagement of the groove 20 with the spring 22 as hereinafter described.

Figures 2, 3:
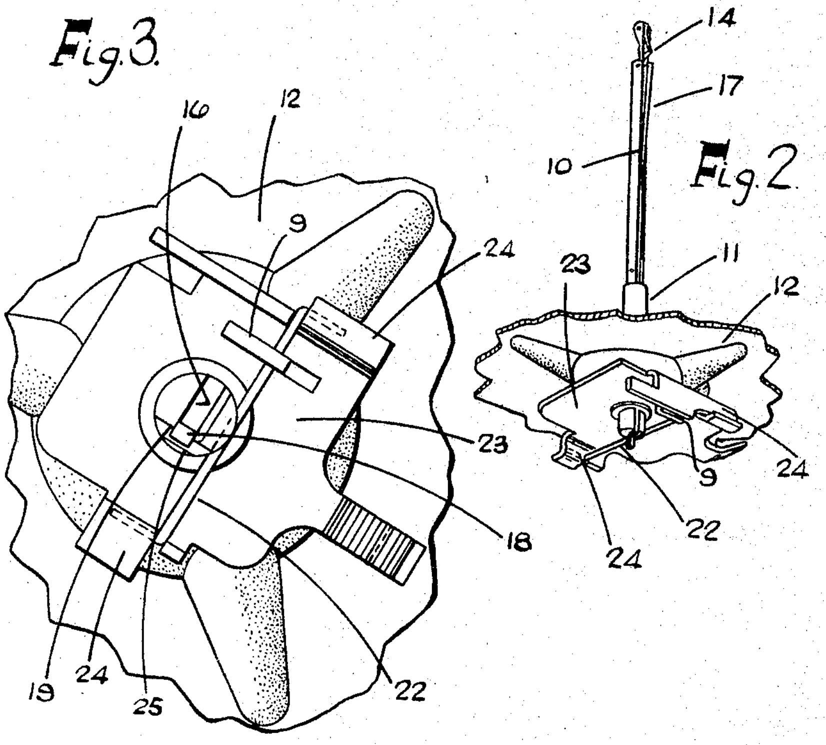
FIGURE 2 is a perspective view from below showing the arrangement of the lower end of the spindle below the base plate.
FIGURE 3 is an enlarged underneath plan view.
Figure 4:
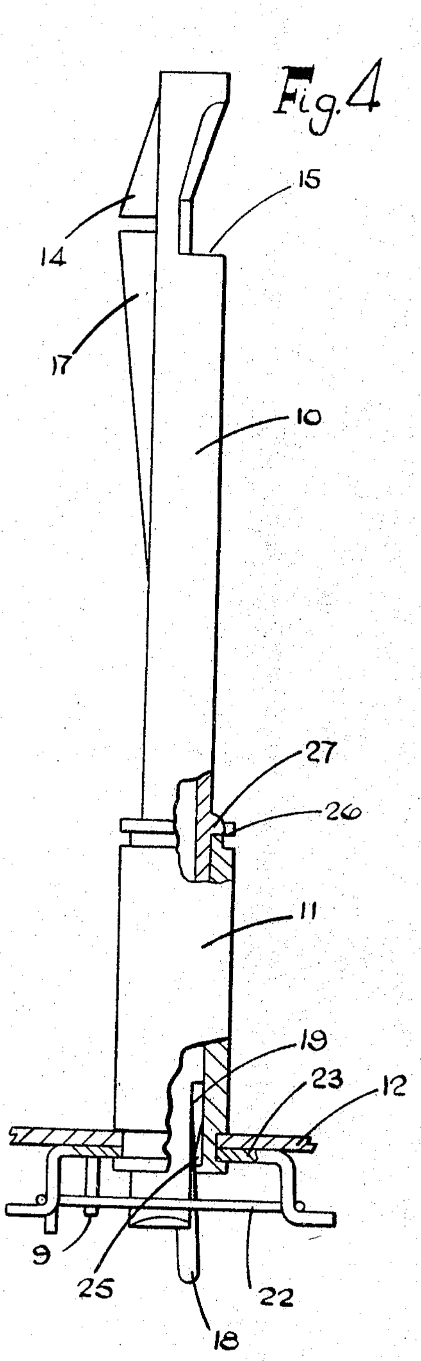
FIGURE 4 is a part sectioned side elevation.

Such spring wire 22 forms the non-positive resilient locking means for the lower end of the spindle and is provided upon an attachment plate 23 which is secured to the end of the central sleeve 11 underneath the base plate 12 with opposed side edges of the attachment plate 23 being bent down to form lugs 24 and the spring wire 22 is anchored at its ends in notches cut in such lugs one lug on each side being bent outwardly to engage underneath the ends of the spring wire (see FIG. 3).

As will be seen from FIGURE 3 the wire 22 is positioned so that it extends across the opening of the lower end of the central sleeve 11 to one side of the central axis thereof and parallel to a line which is tangential to the inner wall of the sleeve so that when the centre spindle is pushed downwardly in the sleeve in the correct position, its chamfered end 21 will engage the spring wire 22 and deflect this sideways until the groove 20 comes opposite the wire, whereupon the wire will spring back into the groove 20 to lock the spindle non-positively against axial displacement. The further lug 9 bent down out of the plate 23 engages under the wire 22 and controls the wire, allowing it to deflect sideways only during insertion of the spindle. This prevents damage to the wire 22 but the wire can still deflect upwardly when the spindle is being removed.

The abutment within the sleeve 11 is formed as a small lug 25 (see FIG. 3 and FIG. 4) on the inner wall of the sleeve near the lower end thereof and is so located that its outer face is in a plane at right angles to the wire 22 and the lug is spaced a short distance away from the wire.

Due to the presence of the lug 25 the lower end of the spindle can only be placed in the sleeve in a certain position in which the cut away flat part 19 is complementary to the lug 25 so as to enable the lower end of the spindle to be slidden in past the lug 25.

This arrangement ensures that the projecting end 18 of the rocking lever 17 is always positioned correctly in relation to the base plate and will, therefore, be operated correctly by the aforesaid reciprocating member. If this were not so the spindle could be inserted with the rocking lever in the wrong position in which case it would be liable to be damaged by the reciprocating member which normally operates it, when an attempt was made to commence a normal automatic cycle of operations.

At its upper end the central sleeve 11 is provided in its wall with a radially extending notch 26 (see FIG. 4) and the centre spindle is provided with a small outwardly and radially extending lug 27 which is adapted to engage in the notch 26 when the spindle is correctly engaged in the sleeve and the spring wire 22 is engaged in the groove 20.

Removal of the spindle is performed by lifting it upwards slightly to disengage the aforesaid lug 27 from the notch 26 after which the spindle is given a slight angular movement, which is possible owing to the clearance between the flattened portion 19 and the abutment lug 25 inside the sleeve (see FIG. 3), allowing the flattened portion 19 at the lower end of the spindle to turn a slight amount either way sufficient to bring the groove 20 in the lower end out of engagement with the spring wire 22 and thereby enabling the spindle to be pulled upwardly out of the central sleeve 11.

What I claim then is:

1. In an automatic record player having a long centre spindle for supporting a setback of records detachably connected to the base plate of the record player and projecting upwardly through the centre of the rotatable turntable, the arrangement of detachable mounting of the spindle comprising; a sleeve having open ends fixed to the base plate and extending upwardly therefrom, a centre spindle slidably engageable in said sleeve, a straight spring wire fixed below the base plate extending across the opening at the bottom of the sleeve and to one side of the axis thereof, a chordal groove formed in the external wall of said spindle, adjacent the lower end thereof, said groove extending at right-angles to the axis of the spindle and said wire being engaged within said groove, a lug projecting radially inwardly and fixed inside said sleeve adjacent the lower end thereof, a chordal recess formed in the external wall of said spindle at the lower end thereof said recess extending upwardly from the bottom of the spindle to form a flat co-operating with said lug to approximately locate the spindle in a correct angular position inside the sleeve, said lug and flat being of a form to permit limited angular rotation of the spindle within the sleeve to partly dis-engage the chordal groove, from the spring wire to enable upwards withdrawal of the spindle.

2. The arrangement according to claim 1 wherein the chordal groove has a flat base and the extent of the angular rotation permitted by the co-operating lug and flat preventing complete dis-engagement of said wire from said chordal groove so that the spindle is spring biased, as a result of inter-engagement of the straight spring wire with said base of said groove, into its correct angular position.

References Cited

UNITED STATES PATENTS

| | | | |
|---|---|---|---|
| 2,616,702 | 11/1952 | Erwood et al. | 274—10 |
| 2,801,109 | 7/1957 | Vistain | 274—10 |
| 3,094,332 | 6/1963 | Vistain | 274—10 |
| 3,095,199 | 6/1963 | Lane | 274—10 |

NORTON ANSHER, *Primary Examiner.*

J. F. PETERS, *Assistant Examiner.*